(12) United States Patent
Lee et al.

(10) Patent No.: US 10,705,379 B2
(45) Date of Patent: Jul. 7, 2020

(54) LIQUID CRYSTAL DISPLAY DEVICE

(71) Applicant: Samsung Display Co., Ltd., Yongin-si (KR)

(72) Inventors: Jiwon Lee, Suwon-si (KR); Seungbeom Park, Yongin-si (KR); Jaesul An, Hwaseong-si (KR); Juyoung Yoon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 34 days.

(21) Appl. No.: 15/970,801

(22) Filed: May 3, 2018

(65) Prior Publication Data

US 2019/0086728 A1 Mar. 21, 2019

(30) Foreign Application Priority Data

Sep. 15, 2017 (KR) ........................ 10-2017-0118274

(51) Int. Cl.
*G02F 1/1335* (2006.01)
*G02F 1/13357* (2006.01)
*F21V 8/00* (2006.01)

(52) U.S. Cl.
CPC ....... *G02F 1/133606* (2013.01); *G02B 6/003* (2013.01); *G02B 6/009* (2013.01); *G02B 6/0016* (2013.01); *G02B 6/0038* (2013.01); *G02B 6/0088* (2013.01); *G02F 2001/133607* (2013.01)

(58) Field of Classification Search
CPC ........ G02B 6/003; G02B 5/02; G02B 6/0016; G02B 6/009; G02B 6/0088; G02F 1/133606; G02F 2001/133607
See application file for complete search history.

(56) References Cited

U.S. PATENT DOCUMENTS 8,625,052 B2 1/2014 Mun et al.
8,780,026 B2 7/2014 Mun et al.
(Continued)

FOREIGN PATENT DOCUMENTS

KR 10-0971719 7/2010
KR 10-1234852 2/2013
(Continued)

*Primary Examiner* — Michael H Caley
*Assistant Examiner* — Agnes Dobrowolski
(74) *Attorney, Agent, or Firm* — H.C. Park & Associates, PLC

(57) ABSTRACT

An LCD device having light weight, slimness, and high luminance, includes: a display panel; a light source providing a light to the display panel; and a light guide plate including an upper surface facing the display panel, an opposing lower surface, a light incidence surface facing the light source, and a light opposing surface opposing the light incidence surface, the light guide plate including a prism area and a non-prism area on the lower surface. The light guide plate further includes a plurality of prisms arranged at the prism area along a first direction which is perpendicular to the light incidence surface, a linear portion disposed at the non-prism area and extending from the plurality of prisms, a first resin layer on the linear portion, and a second resin layer on the first resin layer, wherein the first resin layer is thinner than the second resin layer.

22 Claims, 17 Drawing Sheets

(56) References Cited

U.S. PATENT DOCUMENTS

| | | | |
|---|---|---|---|
| 2008/0225202 A1* | 9/2008 | Joo | G02B 5/0221 |
| | | | 349/64 |
| 2010/0165603 A1* | 7/2010 | Sun | G02B 6/0053 |
| | | | 362/97.2 |
| 2014/0126236 A1* | 5/2014 | Song | G02B 6/0036 |
| | | | 362/607 |
| 2014/0146562 A1* | 5/2014 | Ishida | G02B 6/0038 |
| | | | 362/606 |
| 2017/0184868 A1* | 6/2017 | Lee | G02B 6/0036 |

FOREIGN PATENT DOCUMENTS

| | | |
|---|---|---|
| KR | 10-1580994 | 5/2016 |
| KR | 10-1625089 | 5/2016 |
| KR | 10-2017-0078126 | 7/2017 |

\* cited by examiner

Defective pattern

Defective pattern

Normal pattern

LIQUID CRYSTAL DISPLAY DEVICE

CROSS-REFERENCE TO RELATED APPLICATION

This application claims priority from and the benefit of Korean Patent Application No. 10-2017-0118274, filed on Sep. 15, 2017, which is hereby incorporated by reference for all purposes as if fully set forth herein.

BACKGROUND

Field

Exemplary embodiments of the invention relate generally to a liquid crystal display ("LCD") device having light weight, slimness, and high luminance.

Discussion of the Background

Liquid crystal display ("LCD") devices are a type of flat panel display (FPD) devices which have found wide recent applications. The LCD device includes two substrates including electrodes disposed thereon and a liquid crystal layer interposed therebetween. Upon applying voltage to the electrodes, liquid crystal molecules of the liquid crystal layer are rearranged such that an amount of transmitted light is controlled in the LCD device.

An LCD device, which is a passive-type light emitting device, includes a display panel for displaying a screen and a backlight unit (BLU) for providing light to the display panel. The backlight units are classified into a direct type backlight unit, an edge type backlight unit and a corner type backlight unit according to the position of light sources.

Among those, edge type backlight units are widely used because they are easy to be manufactured, are light in weight, and have low power consumption as compared to direct-type backlight units. In the case of the edge type backlight unit, a plurality of optical sheets for diffusing and collimating a light provided from the light source may be disposed between a light guide plate and the display panel.

In recent times, there has been an increasing tendency to omit a plurality of optical sheets between the light guide plate and the display panel in accordance with a design requirement to make the LCD device slimmer.

The above information disclosed in this Background section is only for understanding of the background of the inventive concepts, and, therefore, it may contain information that does not constitute prior art.

SUMMARY

Devices constructed according to exemplary embodiments of the invention are capable of providing an increased degree of light collimation and an increased center luminance so as to allow the omission of optical sheets in an LCD, allowing lighter and slimmer displays having high luminance.

Embodiments of the present invention may be directed generally to a liquid crystal display ("LCD") device having a relatively slimmer structure by omitting an optical sheet while not degrading display quality.

Additional features of the inventive concepts will be set forth in the description which follows, and in part will be apparent from the description, or may be learned by practice of the inventive concepts.

According to an exemplary embodiment, a liquid crystal display device may include: a display panel; a light source providing a light to the display panel; and a light guide plate including an upper surface facing the display panel, a lower surface opposing the upper surface, a light incidence surface facing the light source, and a light opposing surface opposing the light incidence surface, the light guide plate including a prism area and a non-prism area on the lower surface. The light guide plate further includes a plurality of prisms arranged at the prism area along a first direction which is perpendicular to the light incidence surface, a linear portion disposed at the non-prism area and extending from the plurality of prisms, a first resin layer on the linear portion, and a second resin layer on the first resin layer, and the first resin layer has a thickness less than a thickness of the second resin layer.

A total sum of the thickness of the first resin layer and the thickness of the second resin layer may be about 5 μm or less.

The second resin layer may have a groove having a depth in a range from about 0.005 μm to about 0.01 μm.

The plurality of prisms, the linear portion, the first resin layer, and the second resin layer may include a substantially same material.

Each of the prisms may have a length extending in a second direction which is parallel to the light incidence surface, and each of the prisms may have a longer length from the light incidence surface toward the light opposing surface.

An angle between a first inclined surface of each of the prisms and the lower surface may be less than an angle between a second inclined surface of each of the prisms and the lower surface.

The first inclined surface of each of the prisms may form an angle in a range from about 45 degrees to about 55 degrees with respect to the lower surface, and the second inclined surface of each of the prisms may form an angle in a range from about 70 degrees to about 80 degrees with respect to the lower surface.

A vertex of each of the prisms may have a radius of curvature of about 0.5 μm or less.

Each of the prisms may include: a first prism portion, and a second prism portion adjacent to and parallel to the first prism portion.

Each of the prisms may be formed having a depressed engraved shape.

The light guide plate may further include a plurality of lens patterns on the upper surface.

According to an exemplary embodiment, a liquid crystal display device may include: a display panel; a light source providing a light to the display panel; and a light guide plate including an upper surface facing the display panel, a lower surface opposing the upper surface, a light incidence surface facing the light source, and a light opposing surface opposing the light incidence surface. The light guide plate further includes a plurality of linear patterns disposed apart from each other along a first direction which is perpendicular to the light incidence surface, a first resin layer on a part of the plurality of linear patterns, and a second resin layer on the first resin layer, and the first resin layer has a thickness less than a thickness of the second resin layer.

A total sum of the thickness of the first resin layer and the thickness of the second resin layer may be about 5 μm or less.

The second resin layer may have a groove having a depth in a range from about 0.005 μm to about 0.01 μm.

The plurality of linear patterns, the first resin layer, and the second resin layer may include a substantially same material.

The light guide plate may further include a plurality of lens patterns on the upper surface.

Each of the linear patterns may be formed having a depressed engraved shape.

Each of the linear patterns may be formed so that two or more prisms are arranged adjacent to and parallel to each other.

An angle between a first inclined surface of each of the linear patterns and the lower surface may be less than an angle between a second inclined surface of each of the linear patterns and the lower surface.

A vertex of each of the linear patterns may have a radius of curvature of about 0.5 µm or less.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
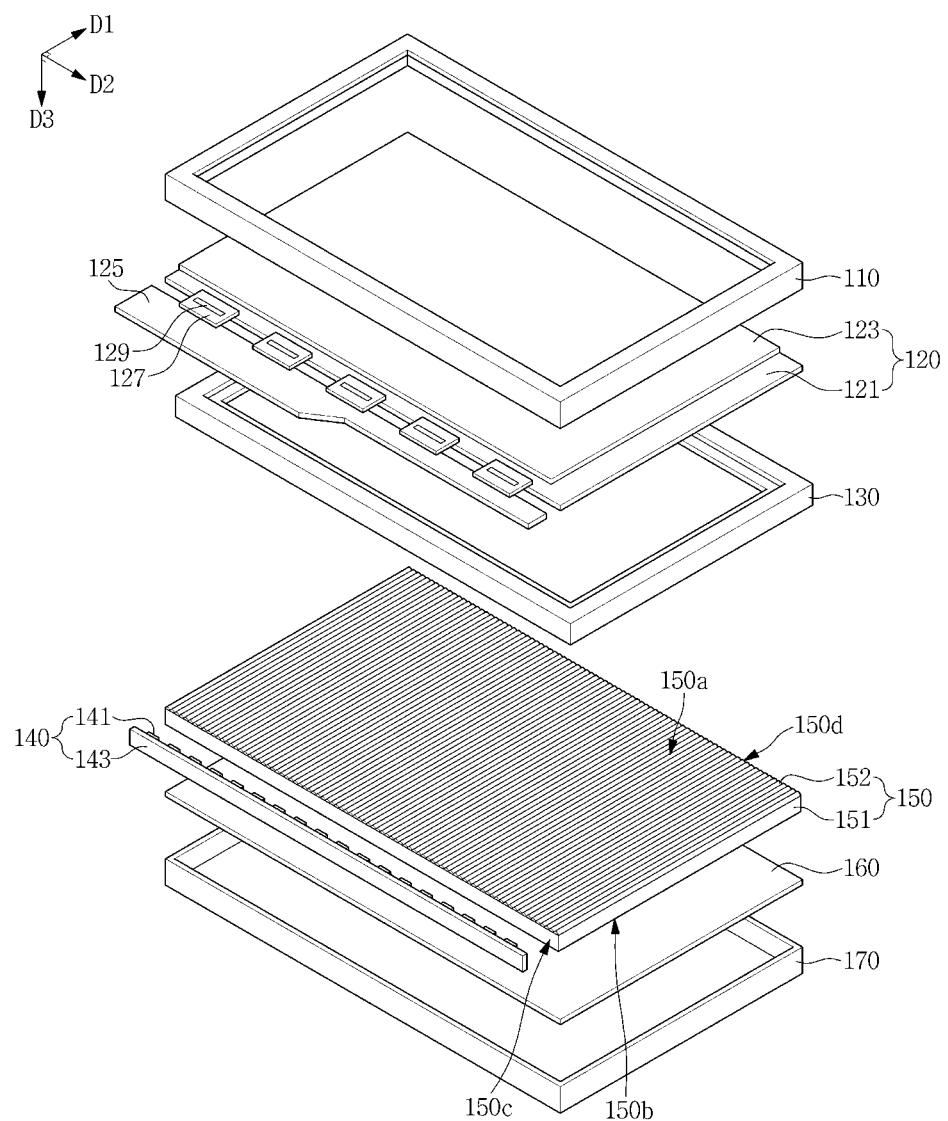
FIG. 1 is an exploded perspective view illustrating an LCD device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is an exploded perspective view illustrating an LCD device according to an exemplary embodiment.

Referring to FIG. 1, a display device according to an exemplary embodiment includes an upper frame 110, a display panel 120, an intermediate frame 130, a light source portion 140, a light guide plate 150, a reflection sheet 160, and a lower frame 170.

Hereinafter, the intermediate frame 130, the light source portion 140, the light guide plate 150, the reflection sheet 160, the lower frame 170, or the like are collectively called a backlight unit.

The upper frame 110 has an opening window for exposing an active area of the display panel 120 to the outside and is disposed so as to cover an edge of a front surface and a side surface of the display panel 120. The upper frame 110 may include a rigid metal material such as stainless steel or a material having good heat dissipation properties such as aluminum or an aluminum alloy.

The display panel 120 may be provided in a quadrangular plate shape to receive an electric signal from the outside and display images. The display panel 120 may include a first substrate 121, a second substrate 123 opposing the first substrate 121, a liquid crystal layer (not illustrated) between the first substrate 121 and the second substrate 123, or the like.

The first substrate 121 includes a plurality of pixel electrodes arranged in a matrix, a thin film transistor applying a driving voltage to each of the pixel electrodes and various signal lines for driving the pixel electrodes and the thin film transistor.

The second substrate 123 is disposed to oppose the first substrate 121, and includes a common electrode including a transparent conductive material, and a color filter. The color filter may include red, green and blue color filters.

The liquid crystal layer (not illustrated) is interposed between the first substrate 121 and the second substrate 123, and is rearranged by an electric field formed between the pixel electrode and the common electrode. As such, the rearranged liquid crystal layer adjusts a transmittance of a light emitted from the backlight unit, and the adjusted light passes through the color filter to display images to the outside.

In addition, a lower polarization plate (not illustrated) may be further disposed on a back surface of the first substrate 121 and an upper polarization plate (not illustrated) may be further disposed on an upper surface of the second substrate 123. The upper polarization plate and the lower polarization plate may have a planar area corresponding to a planar area of the display panel 120.

The upper polarization plate may transmit only a specific polarized light among light arriving from the outside, and absorb or block the remaining light. The lower polarization plate may transmit only a specific polarized light among the light emitted from the backlight unit, and absorb or block the remaining light.

A driving circuit board 125 may be disposed on at least one side of the display panel 120. The driving circuit board 125 may apply various control signals and a power signal for driving the display panel 120.

The display panel 120 and the driving circuit board 125 may be electrically connected to each other by at least one flexible printed circuit board (FPCB) 127. The FPCB 127 may be a chip on film (COF) or a tape carrier package (TCP), and the number of the FPCBs 127 may vary depending on a size and driving scheme of the display panel 120.

A driving chip 129 may be mounted on the FPCB 127. The driving chip 129 may generate various driving signals for driving the display panel 120. The driving chip 129 may be expressed as a driver integrated circuit (IC) or a source IC in which a timing controller and a data driving circuit are integrated into a single chip.

The intermediate frame 130 may support an edge of a back surface of the display panel 120, and accommodate the light source portion 140, the light guide plate 150, the reflection sheet 160, or the like.

The intermediate frame 130 may have a polygonal frame shape with an empty space defined therein. For example, the intermediate frame 130 may have a quadrangular frame shape with an empty space defined therein. The intermediate frame 130 may be formed into a single shape, or may be formed into a plurality of frames as required, and then assembled. The intermediate frame 130 may include a flexible material such as plastic, or may be formed through an injection molding process, for example.

The light source portion 140 includes a light source 141 and a light source substrate 143 on which the light source 141 is disposed.

The light source 141 may be disposed at a corner portion or one side surface of the light guide plate 150. That is, the light source 141 may emit a light toward the corner portion or the one side surface of the light guide plate 150. The light source 141 may include at least one light emitting diode ("LED") chip (not illustrated) and a package (not illustrated) for accommodating the LED chip. For example, the LED chip (not illustrated) may be a gallium nitride (GaN)-based LED chip which emits a blue light.

The number of the light sources 141 may vary in consideration of the size, luminance uniformity, or the like of the display panel 120. The light source substrate 143 may be a printed circuit board ("PCB") or a metal printed circuit board ("metal PCB").

The light source portion 140 may be formed on one side surface, opposite side surfaces, or all four side surfaces of the light guide plate 150 in consideration of the size, luminance uniformity, or the like of the display panel 120. That is, the light source portion 140 may be formed at at least one of corner portions of the light guide plate 150. Herein, the light source portion 140 is assumed to be disposed on one side surface of the light guide plate 150.

Although not illustrated in FIG. 1, a wavelength conversion portion (not illustrated) may be disposed between the light source portion 140 and the light guide plate 150. The wavelength conversion portion (not illustrated) may include a material that may convert a wavelength of the light. For example, the wavelength conversion portion may convert a wavelength of a blue light emitted from a blue LED light source into a white light.

The light guide plate 150 receives the light from the light source 141 and provides the light to the display panel 120. Although described as a plate for convenience of explanation, the light guide plate 150 may be in the form of a sheet or a film to slim down the display device. That is, the light guide plate 150 may be understood as having concepts of a plate and a film for guiding light.

Hereinafter, for ease of description, one surface of the light guide plate 150 facing the display panel 120 is defined as an upper surface 150a, another surface of the light guide plate 150 opposing the upper surface 150a is defined as a lower surface 150b, another surface of the light guide plate 150 facing the light source portion 140 is defined as a light incidence surface 150c, and another surface of the light guide plate 150 opposing the light incidence surface 150c is defined as a light opposing surface 150d.

In addition, for ease of descriptions, a direction perpendicular to the light incidence surface 150c is defined as a first direction D1, a length direction in which the light incidence surface 150c extends is defined as a second direction D2, and a thickness direction of the light guide plate 150 is defined as a third direction D3.

The light guide plate 150 according to an exemplary embodiment may include a body portion 151 and a plurality of lens patterns 152 disposed on the body portion 151.

The body portion 151 may include a material having light transmitting characteristics, such as an acrylic resin, e.g., polymethylmethacrylate (PMMA), polycarbonate, or a tempered glass, so as to guide the light efficiently.

The plurality of lens patterns 152 disposed on the body portion 151 may include a hard coating exclusive resin, and the resin may be UV-cured to have properties similar to those of polycarbonate. The resin may include an oligomer, a monomer, a photoinitiator, silicone, or the like, and may be classified into a soft resin and a hard resin depending on a content of the silicon and monomer.

Descriptions of the shape of the plurality of lens patterns 152 disposed on the body portion 151 will be described in detail below.

The reflection sheet 160 may include, for example, polyethylene terephthalate (PET), and have reflecting characteristics, and one surface thereof may be coated with a diffusion layer including, for example, titanium dioxide. In addition, the reflection sheet 160 may include a material including a metal such as silver (Ag).

The lower frame 170 may include a metal material having high rigidity and excellent heat dissipation characteristics. For example, the lower frame 170 may include at least one selected from the group consisting of stainless steel, aluminum, an aluminum alloy, magnesium, a magnesium alloy, copper, a copper alloy, and an electrogalvanized steel sheet.

Figure 2:
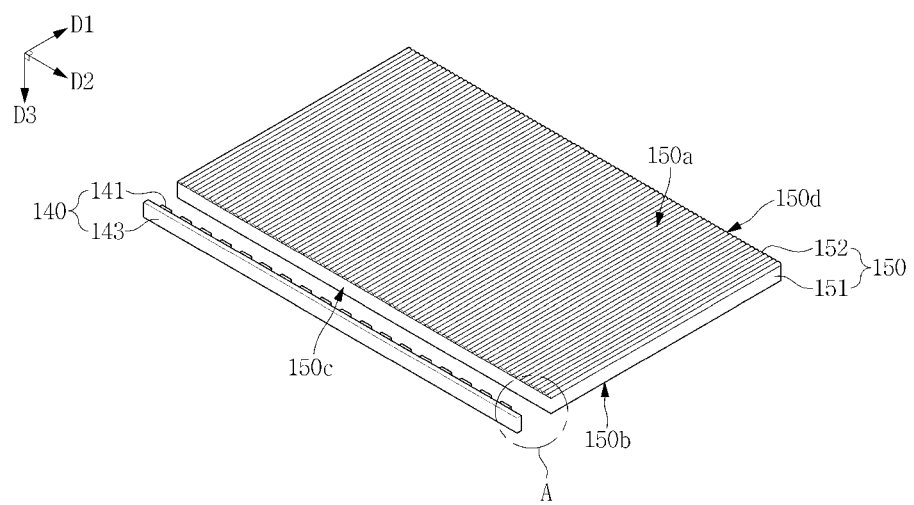
FIG. 2 is a perspective view illustrating a light guide plate and a light source portion according to an exemplary embodiment.
Figure 3:
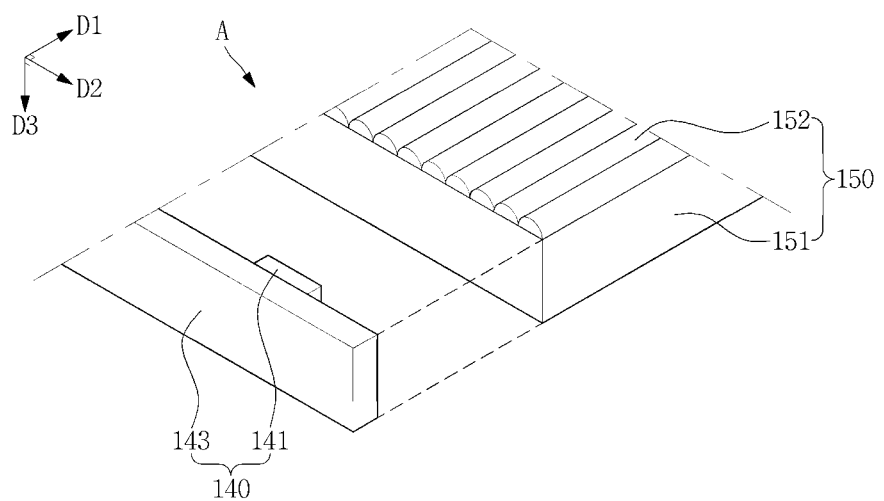
FIG. 3 is a partial enlarged view illustrating an area "A" of FIG. 2.

FIG. 2 is a perspective view illustrating a light guide plate and a light source portion according to an exemplary embodiment, and FIG. 3 is a partial enlarged view illustrating an area "A" of FIG. 2. In detail, FIGS. 2 and 3 are perspective views illustrating the upper surface 150a and the light incidence surface 150c of the light guide plate 150 according to an exemplary embodiment.

Referring to FIGS. 2 and 3, the light guide plate 150 according to an exemplary embodiment may include the lens pattern 152 disposed on the upper surface 150a. The lens pattern 152 may include a plurality of lenses extending in the first direction D1 and arranged along the second direction D2. In an alternative exemplary embodiment, the lens pattern 152 may include a plurality of lenses extending in the second direction D2 and arranged along the first direction D1.

Each lens may have a semicircular or semi-elliptical cross-section, but exemplary embodiments are not limited thereto. Each lens may have a circular or triangular cross-section, and respective cross-sectional areas of the plurality of lenses may be different from each other.

Although FIGS. 2 and 3 show that the lenses disposed adjacent to each other in the second direction D2 are arranged successively, exemplary embodiments are not limited thereto. The plurality of lenses may be spaced apart from each other by a predetermined distance in the second direction D2.

The light guide plate 150 according to an exemplary embodiment may include the lens pattern 152 on the upper surface 150a thereof to collimate the light emitted through the light guide plate 150, and the light guide plate 150 may be substantially prevented from being viewed from the outside.

Figure 4:
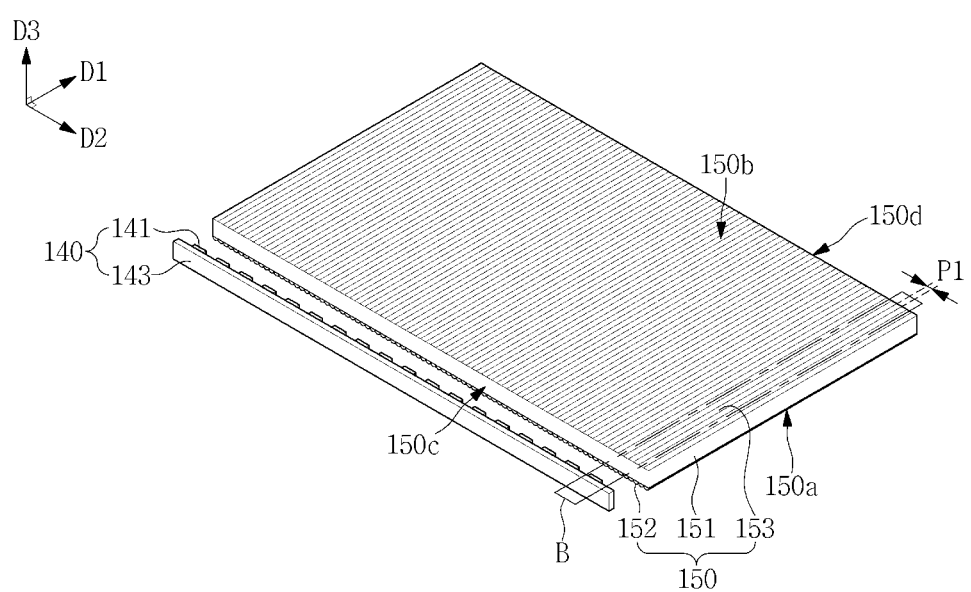
FIG. 4 is a perspective view illustrating the light guide plate and the light source portion according to an exemplary embodiment.
Figure 5:
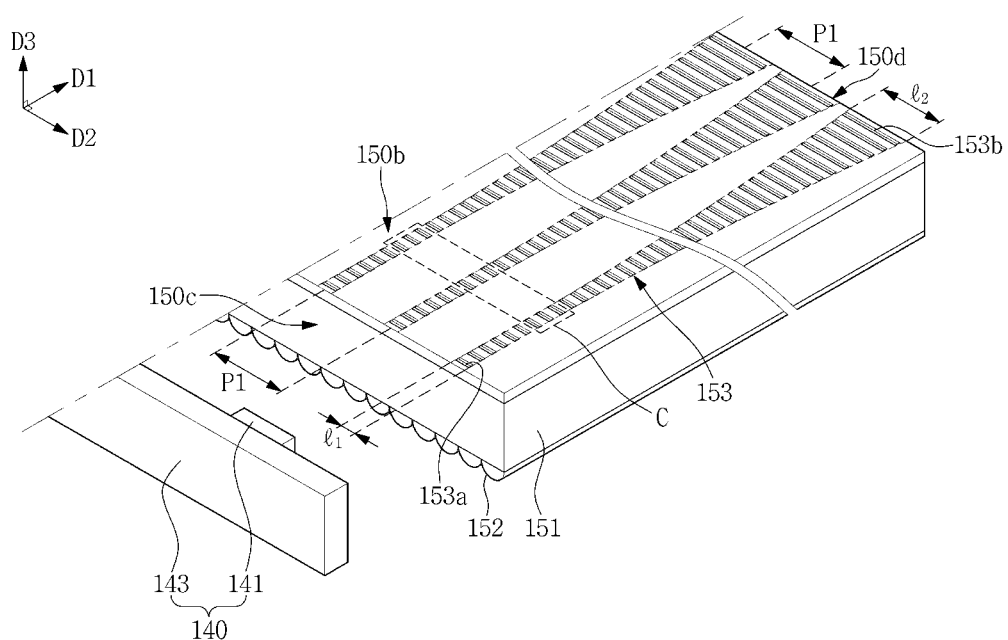
FIG. 5 is a partial enlarged view illustrating an area "B" of FIG. 4.
Figure 6:
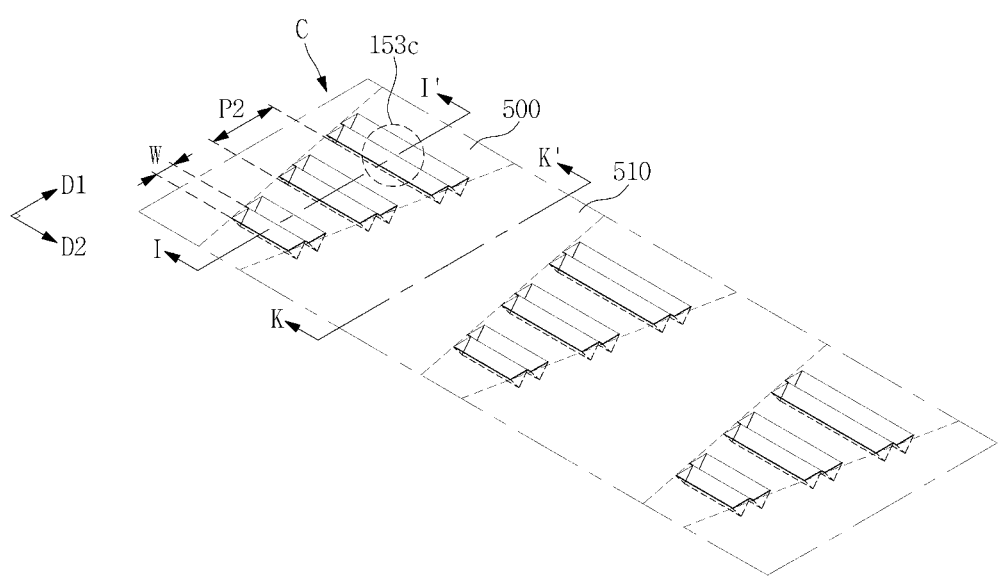
FIG. 6 is a partial enlarged view illustrating an area "C" of FIG. 5.
Figure 7:
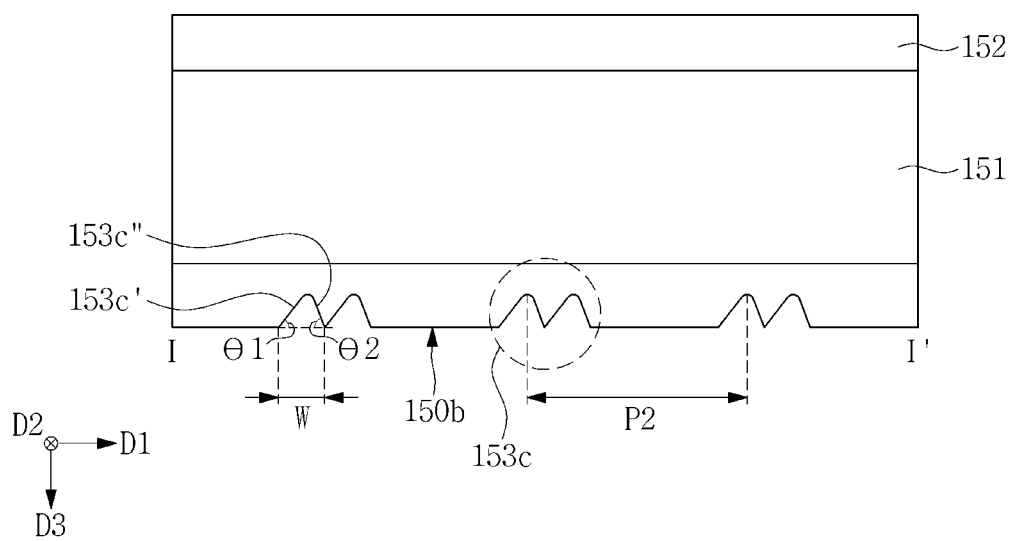
FIG. 7 is a cross-sectional view taken along the line I-I' of FIG. 6.
Figure 8A:
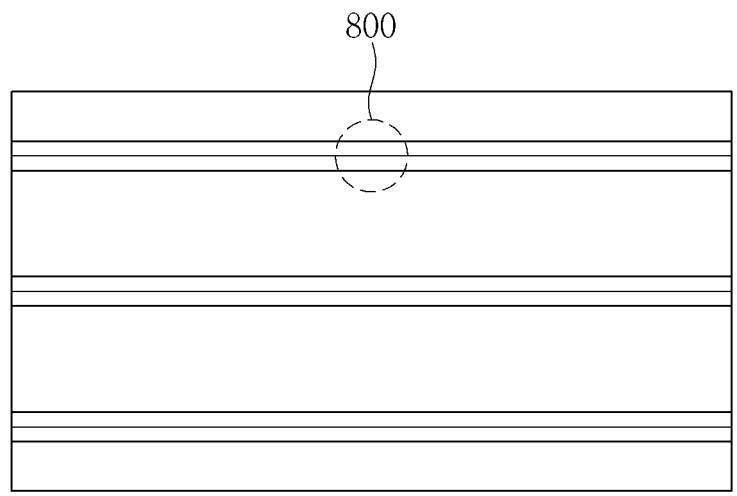
FIG. 8A illustrates a plurality of linear patterns on a lower surface of the light guide plate according to an exemplary embodiment.
Figure 8B:
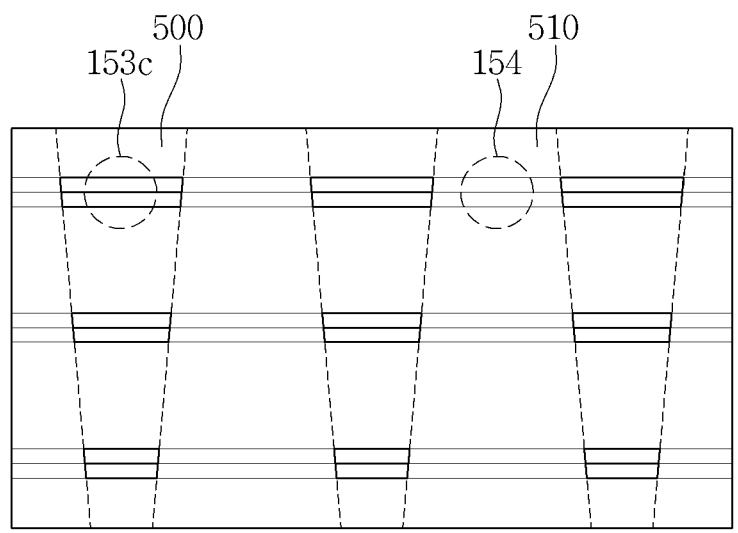
FIG. 8B illustrates a part of the plurality of linear patterns according to an exemplary embodiment to which a resin layer is applied and a prism to which a resin layer is not applied.
Figure 8C:
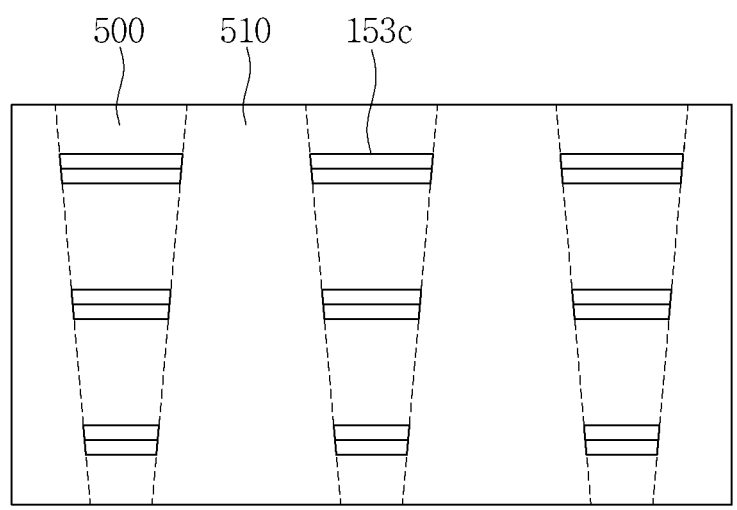
FIG. 8C illustrates a prism area and a non-prism area which are defined based on application of a resin layer according to an exemplary embodiment.
Figure 9:
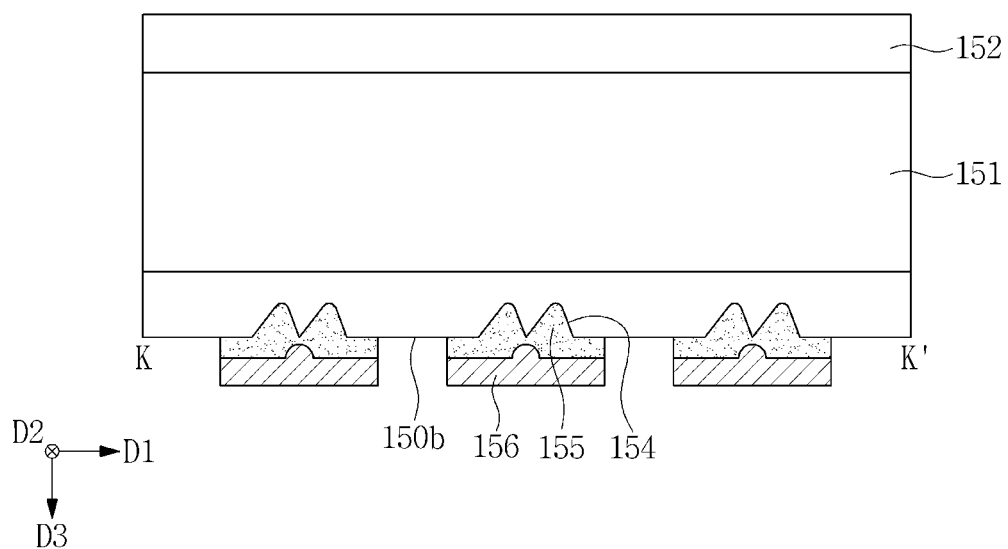
FIG. 9 is a cross-sectional view taken along the line K-K' of FIG. 6.

FIG. 4 is a perspective view illustrating the light guide plate and the light source portion according to an exemplary embodiment, FIG. 5 is a partial enlarged view illustrating an area "B" of FIG. 4, FIG. 6 is a partial enlarged view illustrating an area "C" of FIG. 5, FIG. 7 is a cross-sectional view taken along the line I-I' of FIG. 6, FIG. 8A is an exemplary view illustrating a plurality of linear patterns on a lower surface of the light guide plate according to an exemplary embodiment, FIG. 8B is an exemplary view illustrating a part of the plurality of linear patterns according to an exemplary embodiment to which a resin layer is applied and a prism to which a resin layer is not applied, FIG. 8C is an exemplary view illustrating a prism area and a non-prism area which are defined based on application of a resin layer according to an exemplary embodiment, and FIG. 9 is a cross-sectional view taken along the line K-K' of FIG. 6. In detail, FIGS. 4 and 5 are perspective views illustrating the lower surface 150b and the light incidence surface 150c of the light guide plate 150 according to an exemplary embodiment.

Referring to FIGS. 4, 5, and 6, the light guide plate 150 according to an exemplary embodiment includes a prism area 500 and a non-prism area 510 on the lower surface 150b. In addition, the light guide plate 150 includes a prism pattern 153 disposed at the prism area 500. The prism pattern 153 may include a plurality of prisms 153a and 153b arranged along the first direction D1 which is perpendicular to the light incidence surface 150c and the second direction D2 which is parallel to the light incidence surface 150c. Each of the prisms 153a and 153b may have a length extending in the second direction D2 which is parallel to the light incidence surface 150c.

A length of the plurality of prisms 153a and 153b arranged along the first direction D1 may gradually increase from the light incidence surface 150c toward the light opposing surface 150d. That is, a length $l_1$ of the prism 153a disposed most adjacent to the light incidence surface 150c is the shortest, and a length $l_2$ of the prism 153b disposed most adjacent to the light opposing surface 150d is the longest. By arranging the plurality of prisms 153a and 153b to have a longer length from the light incidence surface 150c to the light opposing surface 150d, a light emitted from the light guide plate 150 may be uniformly provided to the display panel 120.

In detail, the light provided from the light source portion 140 becomes weaker from the light incidence surface 150c toward the light opposing surface 150d. Accordingly, in order to uniformly supply the light to the display panel 120, an amount of light reflected through the prism 153a disposed closest to the light incidence surface 150c should be reduced, and an amount of light reflected through the prism 153b disposed closest to the light opposing surface 150d should be increased. According to an exemplary embodiment, as the prism 153a disposed closest to the light incidence surface 150c has a smallest length and the length of the prisms increases toward the light opposing surface 150d, light may be uniformly provided to the display panel 120.

Each of the prisms 153a and 153b may have a length in a range from about 15 μm to about 140 μm. In addition, the length $l_1$ of the prism 153a closest to the light incidence surface 150c and the length $l_2$ of the prism 153b closest to the light opposing surface 150d may have a predetermined ratio. For example, the length $l_1$ of the prism 153a closest to the light incidence surface 150c and the length $l_2$ of the prism 153b closest to the light opposing surface 150d may have a ratio of about 1:3.55. In addition, the lengths $l_1$ and $l_2$ of the prisms 153a and 153b may be inversely proportional to a size of the light guide plate (or the display panel). For example, when the size of the light guide plate 150 is about 18.2 inches, the length $l_1$ of the prism 153a closest to the light incidence surface 150c may be about 38 μm, and the length $l_2$ of the prism 153b closest to the light opposing surface 150d may be about 135 μm. In addition, when the size of the light guide plate 150 is about 27 inches, the length $l_1$ of the prism 153a closest to the light incidence surface 150c may be about 27 μm, and the length $l_2$ of the prism 153b closest to the light opposing surface 150d may be about 96 μm.

The prisms 153a and 153b arranged along the second direction D2 which is parallel to the light incidence surface 150c may have a predetermined pitch P1. For example, the pitch P1, for example, between a center of prisms 153a and 153b arranged in a line along the second direction D2 and a center of prisms 153a and 153b arranged in another adjacent line along the second direction D2 may be in a range from about 130 μm to about 170 μm.

Referring to FIGS. 6 and 7, each prism 153c disposed in the prism area 500 may be formed in a depressed engraved shape, and may include one prism portion or two or more prism portions. Hereinafter, it is assumed that each prism 153c includes a first prism portion and a second prism portion adjacent to and parallel with the first prism portion. Each prism portion in each prism 153c may have a predetermined width W in the first direction D1. For example, each of the prism portions may have a width W in a range from about 3 μm to about 10 μm in the first direction D1.

The prisms 153c arranged along the first direction D1 which is perpendicular to the light incidence surface 150c may be spaced apart from each other by a predetermined pitch P2. For example, the pitch P2 between a center of one of the prisms 153c and a center of another adjacent one of the prisms 153c may be in a range from about 150 μm to about 190 μm. The pitches P2 between adjacent ones of the prisms 153c spaced apart from each other in the first direction D1 may be substantially equal to each other and may decrease from the light incidence surface 150c toward the light opposing surface 150d.

First inclined surfaces 153c' of the respective prisms 153c may be parallel to each other, and an angle θ1 between the first inclined surface 153c' of each prism 153c and the lower surface 150b of the light guide plate 150 may be in a range from about 45 degrees to about 55 degrees. Alternatively, the first inclined surfaces 153c' of the respective prisms 153c may not be parallel to each other. That is, the prisms 153c may each have the first inclined surfaces 153c' having irregular shapes.

Second inclined surfaces 153c" of the respective prisms 153c may be parallel to each other, and an angle θ2 between the second inclined surface 153c" of each prism 153c and the lower surface 150b of the light guide plate 150 may be in a range from about 70 degrees to about 80 degrees. Alternatively, the second inclined surfaces 153c" of the respective prisms 153c may not be parallel to each other. That is, the prisms 153c may each have the second inclined surfaces 153c" having irregular shapes.

A vertex at which the first inclined surface 153c' and the second inclined surface 153c" of each prism 153c meet may have a radius of curvature of about 0.5 μm or less. In addition, each prism 153c may have a height in a range from about 3 μm to about 10 μm.

The plurality of prisms 153c correspond to partial linear patterns that are disposed at the prism area 500 of a plurality of linear patterns which are disposed at the prism area 500 and the non-prism area 510 and spaced apart from each other along the first direction D1 which is perpendicular to the light incidence surface 150c.

A remaining part of linear patterns that are disposed at the non-prism area 510 of the plurality of linear patterns are to be called a linear portion. A first resin layer and a second resin layer are disposed at the linear portion, and due to the arrangement of the first resin layer and the second resin layer, the linear portion may be substantially prevented from being viewed at the non-prism area 510 of the lower surface 150b of the light guide plate 150.

Referring to FIGS. 6, 8A, 8B, 8C, and 9, the light guide plate 150 according to an exemplary embodiment includes a plurality of linear patterns 800 which are disposed apart from each other on the lower surface 150b along the first direction D1, which is perpendicular to the light incidence surface 150c, a first resin layer 155 on a part of the plurality of linear patterns (i.e., a linear portion 154), and a second resin layer 156 on the first resin layer 155.

The plurality of linear patterns 800 are disposed apart from each other along the first direction D1 at the prism area 500 and the non-prism area 510, the first direction D1 being perpendicular to the light incidence surface 150c.

Each of the linear patterns 800 may have a depressed engraved prism shape, but exemplary embodiments are not limited thereto. In an exemplary embodiment, each of the linear patterns 800 may have a semicircular, semi-elliptical, circular, or triangular cross-sectional shape, and may have a depressed engraved shape or an embossed shape. Each of the linear patterns 800 may have a shape in which two or more prisms are arranged adjacent to and parallel with each other.

The plurality of linear patterns 800 include the plurality of prisms 153c and the linear portion 154. The plurality of prisms 153c are arranged at the prism area 500 along the first direction D1, which is perpendicular to the light incidence surface 150c, to constitute the prism pattern 153, and the linear portion 154 extends from the plurality of prisms 153c and is disposed at the non-prism area 510.

The first resin layer 155 is disposed on a part of the plurality of linear patterns, that is, on the linear portion 154, at the non-prism area 510.

The second resin layer 156 is disposed on the first resin layer 155 at the non-prism area 510.

As the first resin layer 155 and the second resin layer 156 are arranged in the above-described manner, the linear portion 154 may be substantially prevented from being viewed at the non-prism area 510 of the lower surface 150b of the light guide plate 150.

The first resin layer 155 has a thickness less than a thickness of the second resin layer 156. For example, the first resin layer 155 has a thickness of about 2 μm or less, and the second resin layer 156 has a thickness of about 3 μm or less.

The second resin layer 156 has a groove having a depth in a range from about 0.005 μm to about 0.01 μm.

The plurality of linear patterns 800 (i.e., the plurality of prisms 153a, 153b, and 153c and the linear portion 154), the first resin layer 155, and the second resin layer 156 may include a substantially same material or similar materials.

Hereinafter, a process of manufacturing a light guide plate according to an exemplary embodiment will be described.

First, as illustrated in FIG. 8A, the plurality of linear patterns 800 disposed apart from each other along the first direction D1, which is perpendicular to the light incidence surface 150c, are formed on the lower surface 150b of the light guide plate 150.

Next, as illustrated in FIGS. 8B and 9, after the first resin layer 155 is applied on a part of the plurality of linear patterns 800 (i.e., the linear portion 154) and UV-cured, the second resin layer 156 is applied on the first resin layer 155 and UV-cured.

Accordingly, as illustrated in FIG. 8C, the prism area 500 and the non-prism area 510 are finally formed on the lower surface 150b of the light guide plate 150 in a separate manner.

The first resin layer 155 has a thickness less than a thickness of the second resin layer 156. For example, the first resin layer 155 has a thickness of about 2 μm or less, and the second resin layer 156 has a thickness of about 3 μm or less.

The second resin layer 156 has a groove having a depth in a range from about 0.005 μm to about 0.01 μm.

The plurality of linear patterns 800, the first resin layer 155, and the second resin layer 156 may include a substantially same material or similar materials.

Figure 10:
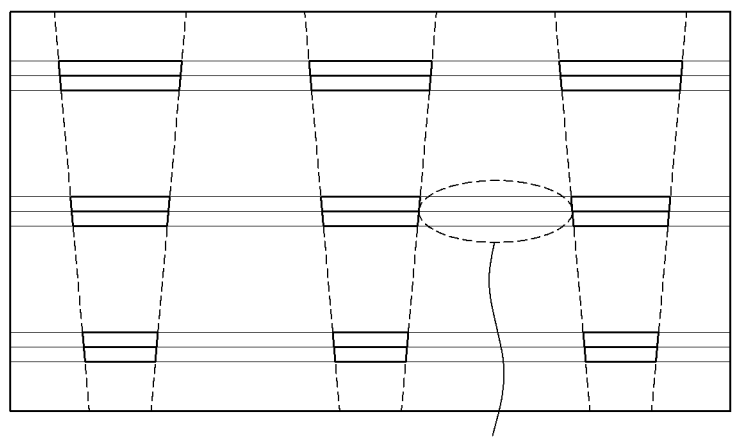
FIG. 10 illustrates grooves generated in the resin layer in a process of manufacturing the light guide plate according to an exemplary embodiment.
Figure 10:
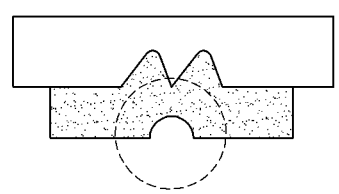
Figure 11:
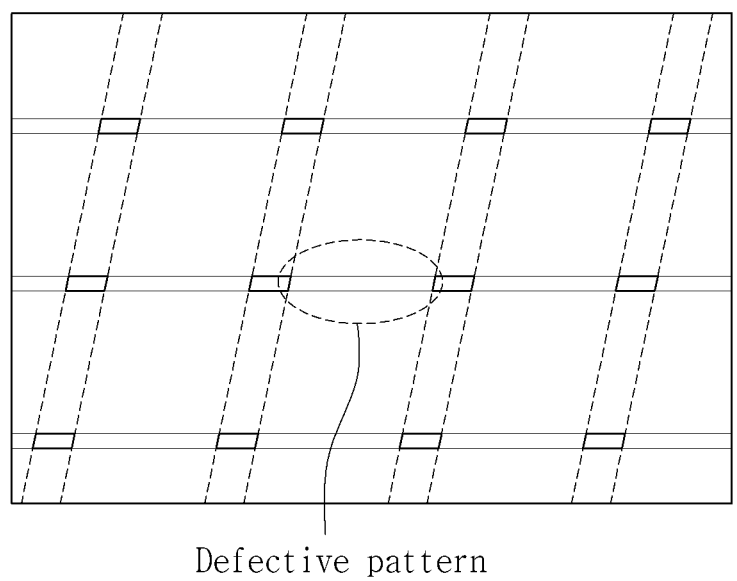
FIG. 11 illustrates a defective pattern viewed in the non-prism area due to the grooves generated in the resin layer in a process of manufacturing the light guide plate according to an exemplary embodiment.
Figure 12:
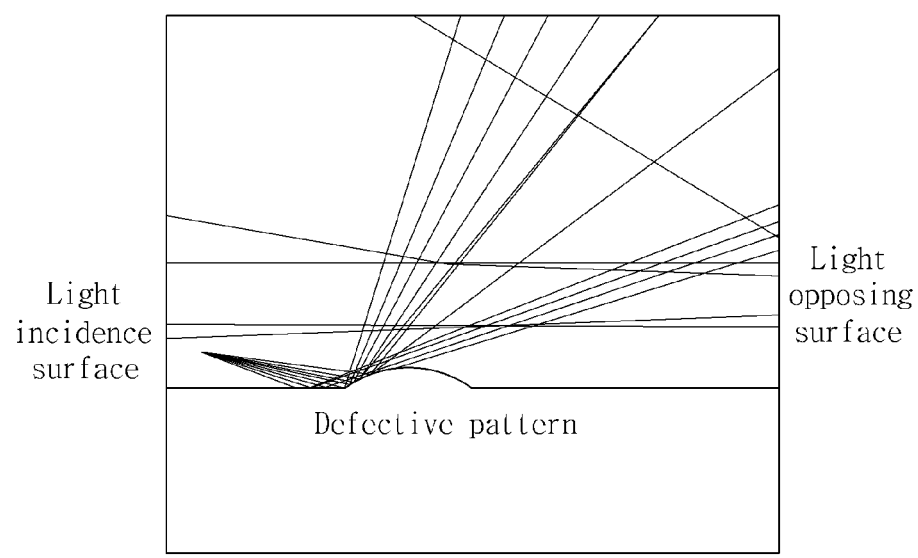
FIG. 12 illustrates a directional light scattering phenomenon in a direction of a light opposing surface due to the grooves generated in the resin layer in a process of manufacturing the light guide plate according to an exemplary embodiment.
Figure 13:
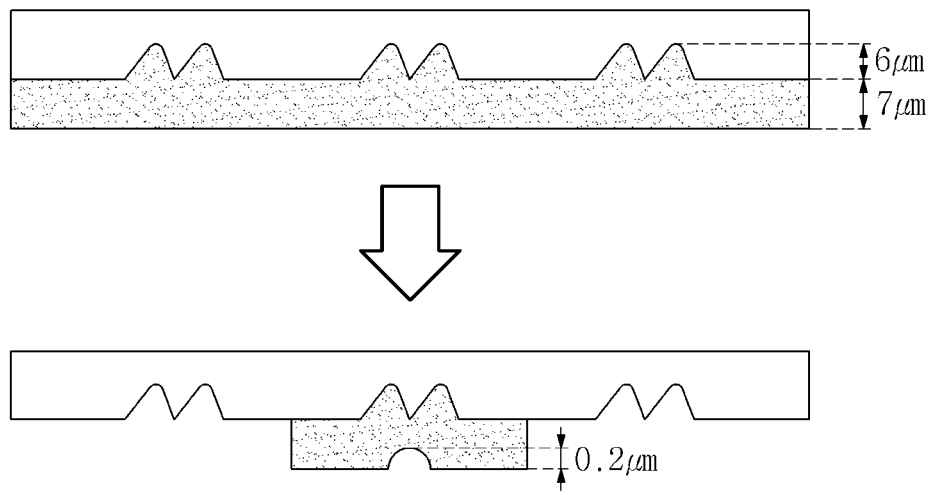
FIG. 13 illustrates a depth of grooves generated when application of a resin layer is performed once in a process of manufacturing the light guide plate according to an exemplary embodiment.
Figure 14:
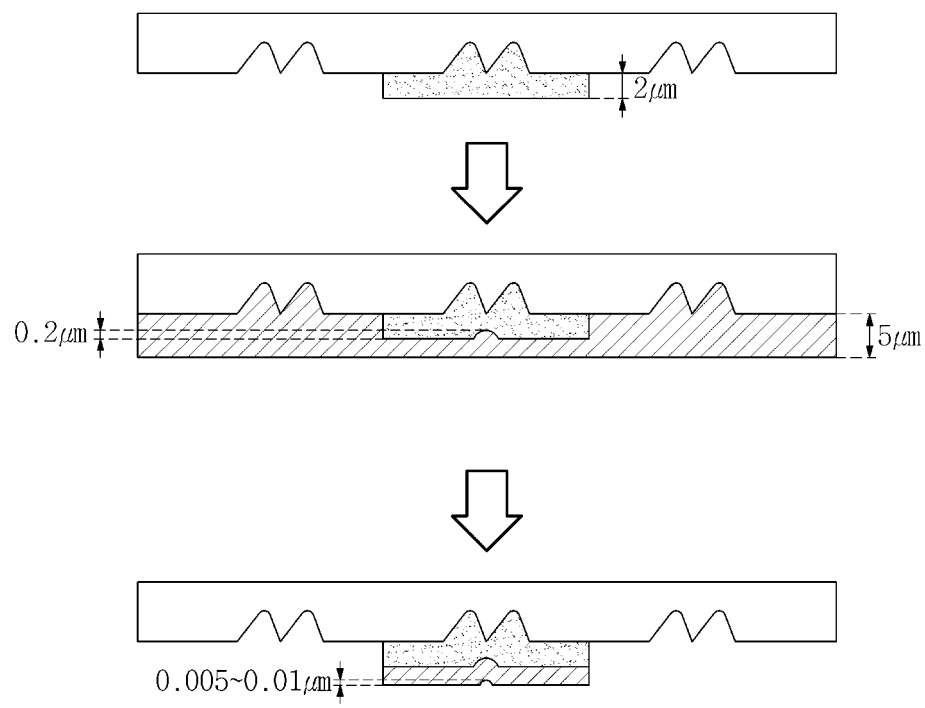
FIG. 14 illustrates a depth of grooves generated when application of a resin layer is performed twice in a process of manufacturing the light guide plate according to an exemplary embodiment.
Figure 15:
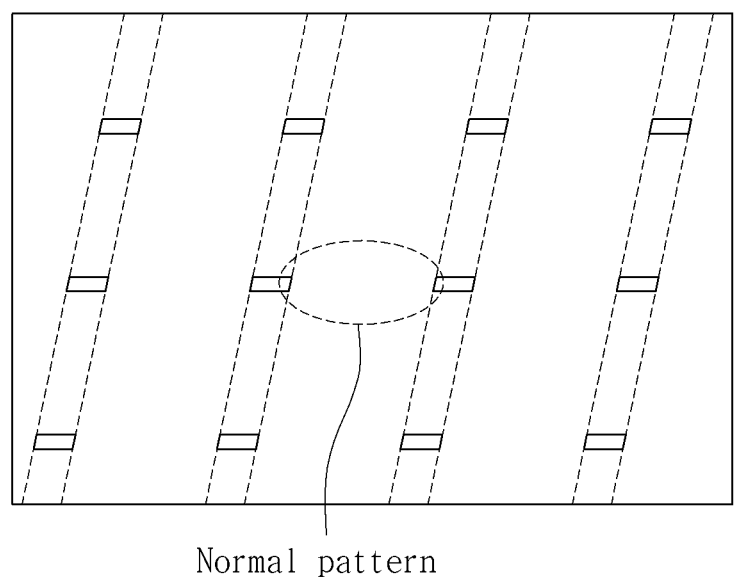
FIG. 15 illustrates a normal pattern viewed in the non-prism area in a process of manufacturing the light guide plate according to an exemplary embodiment.

FIG. 10 is a view illustrating grooves generated in the resin layer in a process of manufacturing the light guide plate according to an exemplary embodiment, FIG. 11 is a view illustrating a defective pattern viewed in the non-prism area due to the grooves generated in the resin layer in a process of manufacturing the light guide plate according to an exemplary embodiment, FIG. 12 is a view illustrating a phenomenon in which a light is condensed in a direction of an opposing surface due to the grooves generated in the resin layer in a process of manufacturing the light guide plate according to an exemplary embodiment, FIG. 13 is a view illustrating a depth of grooves generated when application of a resin layer is performed once in a process of manufacturing the light guide plate according to an exemplary embodiment, and FIG. 14 is a view illustrating a depth of grooves generated when application of a resin layer is performed twice in a process of manufacturing the light guide plate according to an exemplary embodiment. FIGS. 13 and 14 show cross-sections illustrating both of a prism not applied with a resin layer and a linear portion applied with a resin layer, for ease of comparison and description. FIG. 15 is a view illustrating a normal pattern viewed in the non-prism area in a process of manufacturing the light guide plate according to an exemplary embodiment.

When a resin layer is applied on a part of the plurality of linear patterns and UV-cured, as illustrated in FIG. 10, a groove may be generated in the resin layer in a direction of a corresponding linear pattern due to resin shrinkage upon UV-curing. When analyzing the shape of the prism pattern by a microscope, such a groove may be visually recognized as a defective pattern as illustrated in FIG. 11. In addition, due to such a groove, a directional light scattering phenomenon may occur in a direction of the light opposing surface at a degree in a range from about 75 degrees to about 85 degrees, as illustrated in FIG. 12.

When application and UV-curing of the resin layer are performed once, application of a resin layer of about 3 μm to about 5 μm or more is required for uniform surface roughness, and application of a resin layer of about 7 μm or more is required to substantially minimize a depth of the groove. Accordingly, when a resin layer having a thickness of about 7 μm is applied and UV-cured at a time, a groove having a depth of about 0.2 μm may be generated as illustrated in FIG. 13. In addition, when the thickness of the applied resin layer is increased, a yellowing phenomenon may occur after UV-curing, thus reducing luminance and increasing the possibility of incorrect color coordinates.

According to an exemplary embodiment, in order to substantially minimize a depth of the groove, application and UV-curing of the resin layer are repeated twice. For example, a thickness of a resin layer to be primarily applied may be substantially minimized to about 2 μm, and a thickness of a resin layer to be secondarily applied may be about 3 μm to secure the surface roughness. When the process of applying and UV-curing the resin layer is repeated twice as described above, a depth of grooves finally generated in the resin layer may be greatly reduced, thereby improving the directional light scattering phenomenon in a direction of the light opposing surface. For example, as illustrated in FIG. 14, although the first resin layer having a thickness of about 2 μm is applied and UV-cured firstly to generate a groove having a depth of about 0.2 μm, when the second resin layer having a thickness of about 3 μm is applied thereon and UV-cured, a depth of a groove finally generally in the second resin layer may be greatly reduced to about 0.005 μm to about 0.01 μm. In other words, when application and UV-curing of the resin layer are repeated twice, grooves may not be generated in the second resin layer and even though a groove is generated therein, a depth of the groove may be significantly reduced. Accordingly, when analyzing the shape of the prism pattern using a microscope, the defective pattern may not be recognized as in FIG. 15. In addition, when application and UV-curing of the resin layer are repeated twice as described above, an overall thickness of the applied resin layer may be reduced to about 5 μm, and the yellowing phenomenon upon UV-curing may be reduced.

Although not illustrated, when a size (a width (W), height, etc.) of each prism becomes larger or the number of prism portions constituting one prism increases, the depth of the groove may become deeper. In such an exemplary embodiment, application and UV-curing of the resin layer may be repeated three times or more.

As set forth hereinabove, according to one or more exemplary embodiments, an LCD device may achieve a slimmer structure and reduce manufacturing costs by omitting an optical sheet.

In an LCD device according to one or more exemplary embodiments, by disposing a lens pattern on an upper surface of a light guide plate, a light provided from a light source may be collimated and the light guide plate may be substantially prevented from being viewed from the outside.

In an LCD device according to one or more exemplary embodiments, a light guided from the light guide plate may be provided uniformly to the display panel by disposing a prism pattern on a lower surface of the light guide plate.

An LCD device according to one or more exemplary embodiments may improve a directional light scattering phenomenon in a direction of a light opposing surface as application and UV-curing of a resin layer to form the prism pattern are repeated twice to substantially minimize a depth of a groove which may be generated due to resin contraction upon UV-curing. If such directional light scattering phenomenon in the direction of the light opposing surface is improved, the degree of light collimation may increase, such that a center luminance may increase and thus optical sheets may be omitted.

In an LCD device according to one or more exemplary embodiments, an overall thickness of a resin layer applied to form the prism pattern may be substantially minimized, and yellowing phenomenon upon UV-curing may be improved.

Some of the advantages that may be achieved by exemplary implementations of the invention and/or exemplary methods of the invention include an increased degree of light collimation and an increased center luminance so as to allow the omission of optical sheets in an LCD, allowing lighter and slimmer displays having high luminance.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A liquid crystal display device, comprising:
    a display panel;
    a light source providing a light to the display panel; and
    a light guide plate comprising an upper surface facing the display panel, a lower surface opposing the upper surface, a light incidence surface facing the light source, and a light opposing surface opposing the light incidence surface, the light guide plate comprising a prism area and a non-prism area on the lower surface,
    wherein the light guide plate further comprises a plurality of prisms arranged at the prism area along a first direction which is perpendicular to the light incidence surface, a linear portion disposed at the non-prism area and extending from the plurality of prisms, a first resin layer on the linear portion, and a second resin layer on the first resin layer, and
    the first resin layer has a thickness less than a thickness of the second resin layer.

2. The liquid crystal display device of claim 1, wherein a total sum of the thickness of the first resin layer and the thickness of the second resin layer is about 5 μm or less.

3. The liquid crystal display device of claim 1, wherein the second resin layer has a groove having a depth in a range from about 0.005 μm to about 0.01 μm.

4. The liquid crystal display device of claim 1, wherein the plurality of prisms, the linear portion, the first resin layer, and the second resin layer comprise a substantially same material.

5. The liquid crystal display device of claim 1, wherein each of the prisms has a length extending in a second direction which is parallel to the light incidence surface, and
    a length of each of the prisms increases as a distance from the light incidence surface increases.

6. The liquid crystal display device of claim 1, wherein an angle between a first inclined surface of each of the prisms and the lower surface is less than an angle between a second inclined surface of each of the prisms and the lower surface.

7. The liquid crystal display device of claim 6, wherein the first inclined surface of each of the prisms forms an angle in a range from about 45 degrees to about 55 degrees with respect to the lower surface, and the second inclined surface of each of the prisms forms an angle in a range from about 70 degrees to about 80 degrees with respect to the lower surface.

8. The liquid crystal display device of claim 1, wherein a vertex of each of the prisms has a radius of curvature of about 0.5 µm or less.

9. The liquid crystal display device of claim 1, wherein each of the prisms comprises:

a first prism portion, and a second prism portion adjacent to and parallel to the first prism portion.

10. The liquid crystal display device of claim 1, wherein each of the prisms is formed having a depressed engraved shape.

11. The liquid crystal display device of claim 1, wherein the light guide plate further comprises a plurality of lens patterns on the upper surface.

12. A liquid crystal display device, comprising:

a display panel;

a light source providing a light to the display panel; and a light guide plate comprising an upper surface facing the display panel, a lower surface opposing the upper surface, a light incidence surface facing the light source, and a light opposing surface opposing the light incidence surface, wherein the light guide plate further comprises a plurality of linear patterns disposed apart from each other along a first direction which is perpendicular to the light incidence surface, a first resin layer on a part of the plurality of linear patterns, and a second resin layer on the first resin layer, and the first resin layer has a thickness less than a thickness of the second resin layer.

13. The liquid crystal display device of claim 12, wherein a total sum of the thickness of the first resin layer and the thickness of the second resin layer is about 5 µm or less.

14. The liquid crystal display device of claim 12, wherein the second resin layer has a groove having a depth in a range from about 0.005 µm to about 0.01 µm.

15. The liquid crystal display device of claim 12, wherein the plurality of linear patterns, the first resin layer, and the second resin layer comprise a substantially same material.

16. The liquid crystal display device of claim 12, wherein the light guide plate further comprises a plurality of lens patterns on the upper surface.

17. The liquid crystal display device of claim 12, wherein each of the linear patterns is formed having a depressed engraved shape.

18. The liquid crystal display device of claim 17, wherein each of the linear patterns is formed so that two or more prisms are arranged adjacent to and parallel to each other.

19. The liquid crystal display device of claim 17, wherein an angle between a first inclined surface of each of the linear patterns and the lower surface is less than an angle between a second inclined surface of each of the linear patterns and the lower surface.

20. The liquid crystal display device of claim 17, wherein a vertex of each of the linear patterns has a radius of curvature of about 0.5 µm or less.

21. The liquid crystal display device of claim 1, wherein the first resin layer and the second resin layer directly contact each other.

22. The liquid crystal display device of claim 12, wherein the first resin layer and the second resin layer directly contact each other.

* * * * *